Oct. 21, 1969 M. SCHLICHTE 3,474,355

CIRCUIT FOR DECREASING CHARACTERISTIC LOSSES OF INDUCTORS

Filed Feb. 4, 1966 2 Sheets-Sheet 2

United States Patent Office 3,474,355
Patented Oct. 21, 1969

3,474,355
CIRCUIT FOR DECREASING CHARACTERISTIC LOSSES OF INDUCTORS

Max Schlichte, Munich, Germany, assignor to Siemens Aktiengesellschaft, Erlangen, Germany, a corporation of Germany Filed Feb. 4, 1966, Ser. No. 525,157
Claims priority, application Germany, Feb. 8, 1965, S 95,424
Int. Cl. H03h 7/30
U.S. Cl. 333—80 17 Claims

ABSTRACT OF THE DISCLOSURE

This invention relates to a circuit for reducing the characteristic losses of inductive components and to such a circuit for reducing the characteristic losses of filters such as those employed in telephone exchange installations.

CROSS-REFERENCE TO RELATED APPLICATION

Figure 1:
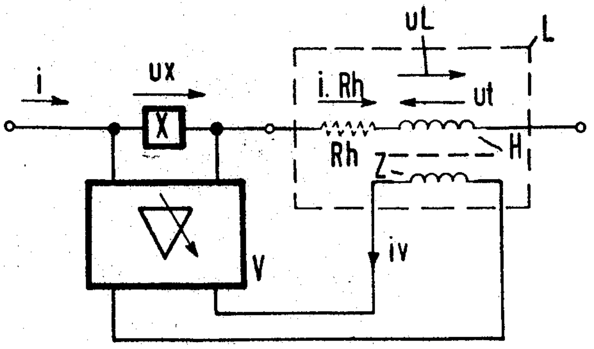

Applicant claims priority from corresponding German application Ser. No. S 95,424, filed Feb. 8, 1965.

In accordance with a preferred embodiment of the invention, there is provided a supplemental winding which is coupled to an inductive element of a filter, and an amplifier which responds to the current through the filter and energizes the supplemental winding to provide compensation for the inherent or characteristic losses of the filter. The amplifier is connected at its input to a reactance through which is conducted a current which is equal to or proportional to the current conducted through the inductance whose losses are to be compensated. The amplifier produces an output which is proportional to the voltage drop across the reactance, and thus proportional to the current through the inductance. The output of the amplifier is applied to the supplemental winding which is wound in a sense, relatively to the winding of the inductor to be compensated, and with regard to the phase of the amplifier output relative to the current through the inductance, such that a voltage is induced in the inductance which is equal in magnitude but opposite in phase to the voltage drop created by the characteristic loss of the inductance.

The invention also contemplates the compensation of characteristic losses of inductive elements connected at earlier or later points of the circuit relatively to the location in the circuit of the compensating network of the invention. For example, when used with a low pass filter connected in a transmission line and including a transformer providing for matching and/or balancing purposes, the circuit of the invention may compensate for the characteristic losses of the transformer and the inductive elements of the filter circuit, in addition to certain losses in the transmission line.

The circuit of the invention may also include automatic adjustment means to provide accurate compensation for the changing characteristic losses of inductive elements occurring with temperature changes.

In accordance with a further embodiment of the invention, a filter including a transformer for matching and/or balancing purposes may utilize the leakage inductance of the transformer as a series inductance of the filter, enabling elimination of an independent filter inductor, while nevertheless there is provided compensation for the characteristic losses of the transformer, including inductance and resistance losses.

STATE OF THE PRIOR ART

The components used in the electrical field which possess inductance also have, as a rule, so-called characteristic losses, by reason of which the desired properties of these components are diminished. Examples of these components are coils and transformers and, under certain circumstances, portions of lines, such as electrically conductive cables and transmission lines. In the following, all these components are designated as inductances. If a decrease of the inherent characteristic losses can be achieved, various advantages can be attained. For instance, if the components in question are in reactance networks, then, by decreasing the characteristic losses thereof, the basic damping characteristic of the circuit can be made considerably smaller than normal. In addition, in certain cases, a substantially steeper rise time and/or decay time of the damping or attenuation curve can be achieved.

It is well known in the art to decrease the characteristic losses of inductances by physically increasing the size of the inductance, for a given inductance value. However, there is often a limitation to increases in the physical size, due to the fact that the inductances in question must be assembled into apparatus whose outer dimensions are limited for ease in handling or by reason of their internal functioning mode. Thus there is a need for decreasing the characteristic losses of inductances without increasing their physical dimensions. On the other hand, if a decrease in the damping characteristic is not necessary, a decrease of the characteristic losses permits the utilization of inductances of physically smaller dimensions than those previously utilized. Thus, the invention may enable achievement of solutions to technical problems which previously could not be suitably solved.

A circuit arrangement which makes possible the decrease of the characteristic losses of inductances, according to the above discussions, has many uses. In particular, it finds applicability in telephone exchange installations, an example of which is given below, and in which a decrease of the size of filters, i.e., of reactance networks may be achieved. In telephone exchange installations with time multiplex audio circuits, there is provided in each subscriber circuit a low pass filter for the de-modulation of amplitude-modulated impulses to which there is connected a transformer for balancing and for matching. In such an installation, the delay times of the amplitude-modulated impulses cannot be overly long; in addition, physical dimensions or size of such an installation also cannot be too large. The size of a time multiplex exchange installation is essentially determined by the number of the accompanying subscriber circuits, which is generally very large (for example, up to 10,000). The dimensions of each individual subscriber circuit is determined by its component transformers and low pass filters. Hence, it is desirable that these components be made as small as possible. However, if the inductances are merely made smaller, then as a result their characteristic losses increase. As a consequence the filter has a greater damping loss in its band pass region, and at the same time the attenuation curve at the ends of the band pass is less steep than normally.

Basically, it would be possible to decrease the damping loss of the filters in a transmission line by inserting amplification. If equal damping is required for both transmission routes, bidirectional amplifiers have to be inserted. However, the attenuation curve at the ends of the band pass is not improved thereby.

If it is possible in an inductance, for example, in an inductance coil, to make some provision for decreasing its characteristic losses, then the inductance of the coil can be increased without increasing the characteristic losses. Similarly, the inductance of a coil of a given size may also be increased without increasing its losses.

Circuits for reducing the characteristic losses of inductances and thereby for improving the quality factor, Q, and the inductance value of a given inductance element have been provided in the prior art. Such a circuit is shown and described in U.S. Patent No. 2,930,996, issued to Woo F. Chow and Jerome J. Suran.

The Chow et al. patent teaches a two-terminal, active element impedance network. The network includes a transistor, an inductor, and a negative resistance element. The first terminal of the network is connected to the base of the transistor. The emitter of the transistor is connected in series with the inductor to a first terminal of the negative resistance. The second terminal of the network is connected to a second terminal of the negative resistance. The negative resistance is provided by a "double-base diode" in one embodiment of the Chow et al. disclosure, and in the alternative in other embodiments, by one or more other transistor elements. The negative resistance provides compensation for the characteristic resistance loss of the inductor. Furthermore, the transistor operates to increase the apparent inductance and the quality factor, Q, of the coil, as measured between the two afore-described terminals of the network. As a result, the network provides an increase of the effective inductance and the quality factor, Q, of the inductor coil, in addition to decreasing its characteristic resistance losses.

The operating conditions of the circuit of the Chow et al. patent require it to be connected with the coil located in a transverse or shunt path of the filter. The use of a shunt inductor is limited generally to high pass filters; the circuit does, however, increase the inductance and Q and decrease the losses of the inductor, whereby a filter in which it is employed may be operated in a very low frequency range (e.g. under 100 cycles per second), in which inductances of several henries are required. A particular disadvantage of this circuit, however, is that the increased inductance is subject to change in response to change in the current gain of the transistor and in the absence of special provisions, the current gain is not reliably constant, and thus the inductance value may vary, creating very undesirable effects in the filter characteristics.

The cost of this circuit also is large because a transistor and a negative resistance (which may require two additional transistors) are necessary for each inductor whose losses are to be compensated.

The circuit also inherently provides an increase of the inductance, which increase may not be desired or necessary, whereas the circuit does not assure a constant value of inductance, which is necessary, particularly in filter circuits.

These and other disadvantages of the circuit of the above-identified patent and of other prior art circuits for reducing the characteristic losses of an inductance are overcome by the circuit of the invention.

OBJECTS OF THE INVENTION

It is therefore an object of this invention to provide an improved circuit for reducing the characteristic losses of an inductor.

A further object of this invention is to provide a circuit for reducing the characteristic losses of a filter network including inductance components.

Another object of this invention is to provide an improved transformer construction operable to reduce characteristic losses of the transformer.

Still another object of this invention is to provide an improved low pass filter circuit of simplified and inexpensive construction.

Still a further object of this invention is to provide a bidirectional filter circuit having compensation for characteristic losses of the filter.

It is a further object of this invention to provide a circuit which provides compensation for characteristic losses of an inductor and of impedances associated therewith.

DESCRIPTION OF THE INVENTION

The invention shows a way to attain the foregoing objects with a single transistor acting as an amplifier element and an additional winding coupled to the inductance of the filter circuit. The additional or supplemental winding makes possible the advantageous application of the invention to the coils in the series legs of a filter, whereby it is possible to improve the properties of low pass filters. Thus the invention concerns a circuit arrangement for the decrease of the characteristic losses of inductances possessing at least one main winding each and, in particular, of inductances in systems of telephone exchange installations. This circuit arrangement is characterized by the fact that the inductance in question carries a supplemental winding which is energized by an amplifier, the input of which is connected across a reactance which is connected to a main winding of the inductance. The amplifier produces a current in the supplemental winding of such phase relationship and magnitude that a voltage is induced in the main winding in question to decrease the voltage drop caused by losses.

However, a transformer can also be utilized as an inductance having two main windings (primary and secondary) in which a voltage decreasing the losses is induced. The appropriate phase relationship of the voltages induced in the main windings can be achieved by use of a supplemental winding interlinked with the stray field of this transformer. The part of the supplemental winding which is effective with regard to the primary winding then can produce a magnetic flux which is of opposite phase to the magnetic flux which is produced by means of the part of the supplemental winding which is effective with regard to the secondary winding. This can be achieved, for example, through a special arrangement of the transformer, i.e., if there are utilized, as the supplemental winding, a cylindrical winding consisting of two adjacent halves and, as the main windings, two disc-shaped windings. The flux leakage of this transformer is determined through the cooperation of an air gap located in the "iron" core thereof with a ferro-magnetic winding chamber wall located between the two halves of the cylindrical winding and separating the two disc-shaped windings. In the case of a circuit arrangement containing a transformer providing for matching and/or balancing purposes in the case of a low pass filter, the predetermined leakage inductance of this transformer, as defined above, can also be utilized as the series inductance of the low pass filter. In this manner a coil otherwise necessary can be omitted.

The invention can also be utilized to decrease the losses of impedances connected in the circuit before and/or after the inductance, in addition to the characteristic losses of the inductance to which the supplemental winding is coupled.

In addition, further advantages stemming from the invention will become apparent from the following description.

Figure 2A:
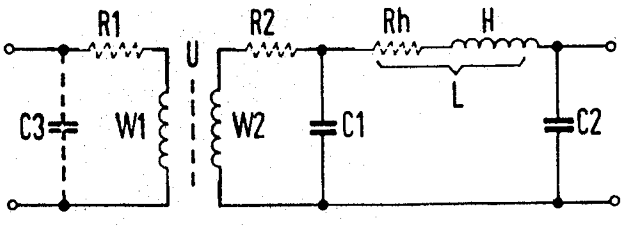
Figure 2B:
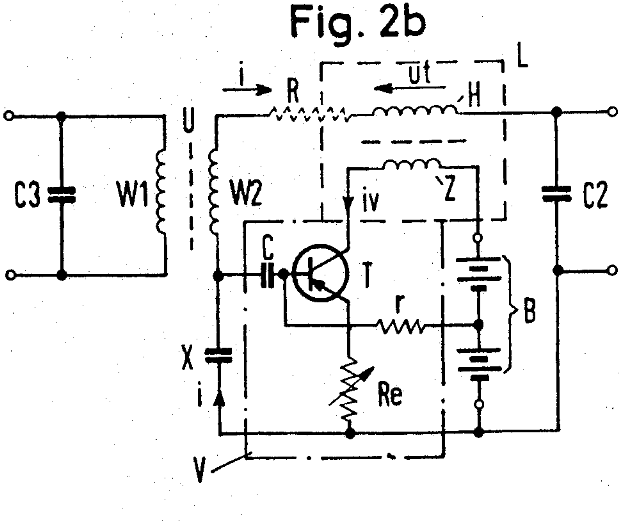
Figure 3A:
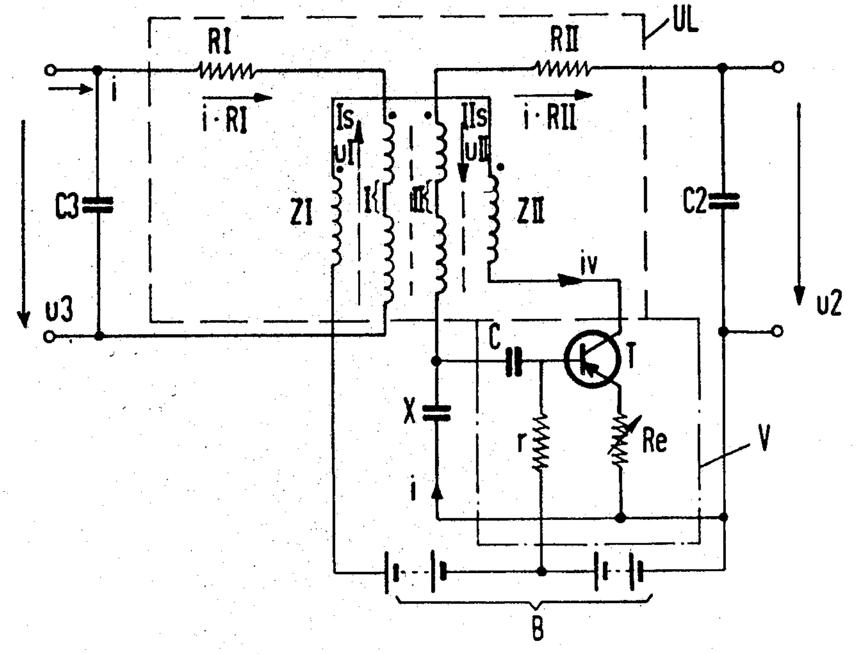
Figure 3B:
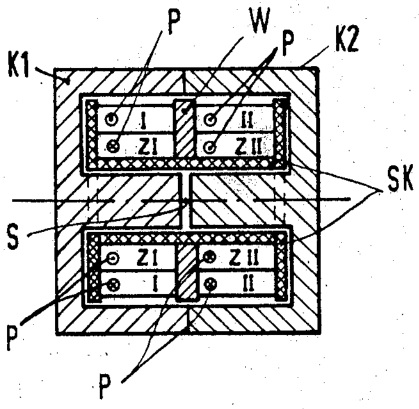
Figure 3C:
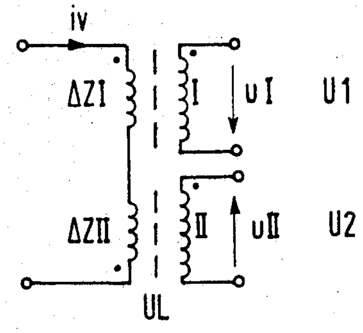

For a better understanding of the invention, reference may be had to the following drawings, in which:

FIG. 1 is a schematic of a first embodiment of a circuit in accordance with the invention;

FIG. 2*a* is a schematic of a prior art transformer-low pass filter combination;

FIG. 2*b* is a schematic of a second embodiment of the circuit of the invention incorporating the transformer-low pass filter combination of FIG. 2*a*;

FIG. 3*a* is a schematic of a third embodiment of the circuit of the invention incorporating a transformer-low pass filter combination wherein the leakage inductance of the transformer provides the series inductance of the low pass filter;

FIG. 3*b* shows, in vertical section, the construction of a transformer suitable for use in the circuit of FIG. 3*a*; and, FIG. 3*c* is an equivalent circuit schematic of the transformer of FIG. 3*b*.

FIG. 1 shows an inductance coil L composed by a pure inductance H and a resistance loss represented by resistor R*h*. In addition, this coil carries a supplemental winding Z inductively linked with main winding Z and which is energized by amplifier V. Amplifier V has its input connected across a reactance element X, the reactance X being connected in series with the winding H.

A current *i* is shown being conducted in the direction of the arrow through the reactance element X and the coil L producing a voltage drop *ux* across the reactance element X and a voltage drop *i·Rh* across the resistance R*h*. The alternating current *i*, of course, also produces a voltage drop across the coil H due to its inductance. The voltage drop across the coil L ideally is a function only of the inductance of the coil; the actual voltage drop, however, of a practical inductor also includes the *i·Rh* component which constitutes a resistance loss in the coil L.

This resistance loss is compensated, however, by the action of the amplifier V and the supplemental winding Z. Amplifier V, in response to the voltage *ux* at its input, produces an output voltage resulting in an alternating current *iv* conducted through the supplemental winding Z. As hereinafter described, the phase of the alternating current *iv*, and the magnitude thereof is such as to induce a voltage *ut* in the winding H which opposes the effect of the voltage drop *i·Rh* across the loss resistor R*h*, resulting in the coil L appearing as an ideal inductor with no resistance loss.

The voltage drop *i·Rh* is in phase with the current *i*; voltage *ut*, therefore, must be opposite in phase to the coil current *i*. To achieve this effect, the reactance X, lying in series with primary winding H and therefore conducting the coil current *i*, is utilized. The voltage induced in the winding H either precedes or follows by 90 degrees the current *iv* flowing through supplemental winding Z, according to the polarity of the supplemental winding. Therefore, under the condition that the amplifier V supplying current *iv* causes no phase change, the voltage drop across reactance X must, as opposed to current *i*, also precede or follow by 90 degrees. It follows that reactance X can be represented either by a condenser or a coil, whereby the winding sense of the interacting, or coupled, windings H and L of coil L is to be selected accordingly.

If reactance X is a condenser, then the voltage *ut* induced in the main winding H of coil L is independent of the frequency; i.e., the voltage drop across the condenser is inversely proportional to the frequency, while the voltage *ut* induced in the main winding H being proportional to the rate of change of the energizing current, is directly proportional to the frequency. The two frequency-dependent effects therefore cancel one another. However, if the reactance X is an inductor, then the frequency dependencies in question do not cancel one another and the voltage induced in the main coil by current through the supplemental coil is dependent on the frequency. Frequency-independent losses of inductors, as for example the resistance losses of the windings, therefore can be decreased over a broad frequency band, if a condenser is utilized as reactance X. If a coil is utilized as reactance X, such losses can be decreased only in a narrow frequency band.

Now a general view of the mode of functioning of a circuit arrangement according to the invention is given. As shown in FIG. 1, at reactance X, a voltage *ux*, proportional to current *i* flowing through the primary winding H of coil L, is tapped off and applied to the adjustable amplifier V. The amplifier V supplies a current *iv*, portional to current *i* flowing through thep rimary winding Z of coil L. As a result, a voltage *ut* is induced in the main winding H of coil L, which corresponds to the polarity of the main winding, and is opposite in phase to the voltage drop *i·Rh* across the resistor R*h*, representing the resistance loss of the coil L. Therefore, by an appropriate adjustment of the amplification of amplifier V, this voltage drop or loss *i·Rh* is substantially compensated, and the characteristic losses of the coil are reduced. In addition, there is produced, as usual, a voltage drop *u*L, due to the inductance of the winding H caused by current *i* flowing therethrough, the voltage drop *u*L leading the current *i* by 90 degrees. Therefore, the value of the inductance of coil L is not changed, and is independent of the degree of amplification of amplifier V. The system of the invention therefore does not change the value of the inductance, but compensates for characteristic resistance losses of the inductor.

As has already been mentioned, with the aid of the invention, the losses of impedances connected in circuit with, and either before or after, the inductance may also be reduced, in addition to reducing the characteristic resistance loss of an inductance L. The following description is an example of such a circuit wherein a coil again is provided as the inductance and wherein the losses of a transformer, having one winding thereof connected in series with this cil, are also reduced. This example concerns a low pass filter; the original or prior art circuit of the filter, without incorporating the teachings of the invention, is shown in FIG. 2*a*. This prior art circuit must be slightly modified before incorporating the teachings of the invention.

The prior art circuit shown in FIG. 2*a* consists of transformer U, two capacitors C1 and C2 and a coil L. In FIG. 2*a*, the resistors representing the resistance losses of the inductors in question are shown separately; resistor R*h* is the resistance loss of coil L (as in FIG. 1), resistor R1 is the resistance loss pertaining to the primary winding W1 of transformer U, and resistor R2 is the resistance loss pertaining to the secondary winding W2 of transformer U. Shunt capacitor C1, located on the secondary side of transformer U in parallel with winding W2 can, in a known manner, be eliminated and have substituted therefor a capacitor located on the primary side of the transformer U in parallel with winding W1; the substitute capacitor has a different capacity, changed according to the transformation ratio of the transformer. This substitute capacitor is shown in FIG. 2*a*, in broken lines, as capacitor C3. The three loss resistors R1, R2 and R*h* can be combined and represented as one single loss resistor after substitution of capacitor C1 by capacitor C3. This loss resistor, representing the combined losses of resistors R1, R2 and R*h* is designated by the letter R and shown in FIG. 2*b*, which will be discussed later.

First, the prior art circuit arrangement shown in FIG. 2*a* will be considered briefly. The circuit comprises a low pass filter, the transformer U of which can be utilized for matching and/or balancing purposes. The filter properties are determined by capacitor C2 as well as capacitor C3 (the latter being substituted for capacitor C1 as described above) in conjunction with coil L.

FIG. 2*b* shows the filter of FIG. 2*a* including the foregoing modifications, and further including the teachings of the invention, whereby compensation is provided for the losses of all inductances. As described above with reference to FIG. 1, coil L is provided with a supplemental winding Z, which is energized by amplifier V, which in turn is connected to reactor X. In this case, amplifier V comprises a transistor T having an adjustable emitter resistor R*e*, a capacitor C providing for coupling to the base of transistor T, and a resistor *r*, providing biasing to the base of transistor T for determining the operating point of the transistor T. The collector circuit of transistor T is connected in series with the supplemental winding Z to battery B. Capacitor C also couples the base of transistor T to the series connection of the winding W2 and the reactance X. The reactance X is connected in series with the secondary winding of transformer U and the main winding H of coil L.

The emitter resistor R*e* of the transistor T causes a negative feedback. It is therefore possible, by changing the setting of this resistor to adjust the amount of amplification of amplifier V and thereby the extent of the decrease of the losses of the inductances. By contrast to FIG. 1, in FIG. 2*b* the reactance X is not directly connected to the main winding H of coil L. As a result, not only the losses of the coil L, but also the losses of the transformer U, which is connected at an earlier point in the circuit, can be reduced. In other respects, the mode of functioning of this circuit arrangement as relates to the decrease of the characteristic losses of the inductors is analogous to the mode of functioning of the circuit arrangement shown in FIG. 1.

In operation, the alternating input signal to the filter, and thus to the winding W1 induces a voltage in winding W2 which, in turn, produces an alternating current *i*. The current *i* produces a voltage drop across reactance X shown to be a capacitor, which is coupled through capacitor C as an input signal to the base of transistor T. Transistor T produces a current *iv* in response to the input signal at its base; the current *iv* is conducted through the supplemental winding Z and, due to the coupling between the latter and main winding H, induces a voltage in main winding H. The voltage thus induced must be of the opposite phase to that of the voltage drop $i \cdot R$, constituting the characteristic resistance loss in the filter, and thus to that of the current *i*, to oppose and thereby compensate for the voltage drop $i \cdot R$. The proper phase of the induced voltage is readily determined and provided, as is well known in the art, with reference to the phase of the input signal (developed across capacitor X by current *i*) relative to that of current *i*, the phase of the current *iv* relative to that of the input signal (this phase relationship depending on the characteristics of the amplifier V) and the sense of the winding Z relative to main winding H. By adjusting the emitter resistance R*e*, the magnitude of the current *iv* is controlled to produce an induced voltage *ut* which is equal in magnitude to the voltage drop $i \cdot R$, whereby the latter is cancelled. The amplifier V, in conjunction with the supplemental winding Z therefore compensates for the characteristic losses of the filter, making it appear as free of losses at the output terminals of the filter, across the capacitor C2.

With regard to the characteristics of inductances at low frequencies, the resistance or copper losses of the windings become particularly appreciable, as compared to other losses. These resistance losses are increased due to the temperature coefficient of the copper or other metal of the windings, which results in the winding resistance increasing with rising temperature. This effect is compensated by providing that the negative feedback of amplifier V change in dependence on the temperature. This decrease of the negative feedback is achieved automatically by making the emitter resistor R*e* a temperature-dependent resistor. The emitter resistor R*e* is selected to have an appropriate temperature coefficient such that its resistance decreases with increasing temperature, thereby reducing the negative feedback effect and increasing the conduction of transistor T for increasing temperature. Thus, the current through the supplemental winding Z is increased and induces a larger voltage *ut* in the winding H, compensating for the increased voltage drop $i \cdot Rh$ resulting from the increased resistance of the windings with increased temperature, and providing a substantially constant inductance value of the coil L.

In the case of the low pass filter shown in FIG. 2*a*, coil L can be omitted if the transformer U is constructed in such a way that its leakage inductance is the same as the required inductance of coil L for given filter characteristics. As can be seen from known equivalent circuit diagrams of a transformer, the leakage inductance of the transformer U may be substituted for the inductance value of the inductor H, so that coil L can be omitted. There is decribed in detail below, a tranformer which is suitable for this purpose. The transformer includes a supplemental winding, which is energized by an amplifier and which is coupled to the main windings of the transformer in such a way that the amplifier produces a current through the main windings which is of the proper phase and magnitude to cancel the characteristic losses.

The suitable phase positions of the voltages induced in the main winding are obtained here by utilization of the leakage flux of the transformer. There is provided a supplemental winding having two portions producing oppositely directed magnetic flux fields and coupled to respectively associated ones of the main windings of the transformer.

FIG. 3*b* shows such a transformer in longitudinal section. It consists of the two core halves K1 and K2, consisting of ferro-magnetic material, as well as a coil structure S*k*, carrying four windings, i.e., a primary winding I, a secondary winding II, and portions ZI and ZII of a supplemental winding. The core halves can be rotationally symmetrical cup-shaped core shells or core shells of rectangular section. The core structure includes a central portion extending along the axis from each end and defining an air gap S at the center thereof. Between the primary windings I and II, and the supplemental windings ZI and ZII, a magnetic winding chamber wall W, which, preferably, also consists of ferro-magnetic material, is provided on the coil support S*k*, in the vicinity of air gap S. This winding chamber wall W provides a magnetic path for the leakage flux of the transformer, i.e., the flux which, in the usual case, is produced by one winding of the transformer but which is not coupled or linked to the other winding.

It is evident that, by suitable dimensioning of this winding chamber wall W and the air gap S, there is provided a magnetic shunt to the main flux path, penetrating both core halves; thus, the ratio of the leakage flux to the flux in the main flux path can be changed. In this way it is possible, for example, for a given primary inductance of the transformer, to modify the leakage inductance thereof within broad limits. While the main primary winding I of the transformer U is not coupled very closely with the main secondary winding II, due to the leakage path through the winding chamber wall W, the winding portion ZI is very closely coupled with the primary winding I lying immediately above it, and also the winding portion ZII is very closely coupled with secondary winding II. However, the coupling of winding portion ZI with the main winding II, lying on the other side of winding chamber wall W, and also the coupling of winding portion ZII with main winding I is not very close.

Reference is now made to the standard current direction notations P shown in FIG. 3*b*; when an alternating current is conducted through the winding portions ZI and ZII of the supplemental winding, which are connected as series cylindrical windings but in opposite sense, the magnetic flux paths of these winding portions ZI and ZII are oppositely directed to the left and to the right of the winding chamber wall W, respectively, and thus are of opposite phases. The voltage induced in primary winding I by current in the suppplemental winding is primarily due to the magnetic flux field of partial winding ZI, since primary winding I is more closely coupled to the partial winding ZI than to the winding portion ZII. Similarly, the corresponding voltage which is induced in secondary winding II is primarily due to the magnetic flux field of partial winding ZII, since the secondary winding II is more closely coupled to winding portion ZII, than to winding portion ZI. Thus, in the primary and secondary windings I and II of transmitter U there are induced two voltages of opposite phase, by the same supplemental winding current.

With regard to the effect of the opposite senses of the two portions of the supplemental winding, the above described transformer can be thus thought to consist of two transformers. However, these two transformers are coupled together through the flux path linking the primary and secondary windings I and II. The two transformers are shown in an equivalent circuit schematic in FIG. 3*c* and are designated U1 and U2 respectively, together identified as transformer UL. Winding I of transformer UL corresponds to primary winding I of FIG. 3*b*; and winding II of transformer U2 corresponds to secondary winding II of FIG. 3*b*.

As described above, the voltage induced in primary winding I by the magnetic field of winding portion ZI is dominant. The effects of the respective magnetic flux fields of the winding portions ZI and ZII on the primary winding I are therefore represented by winding ΔZI of the transformer portion U1. Similarly, the voltage which is induced in secondary winding II by the magnetic field of winding portion ZII is dominant. The effects of the respective magnetic flux fields of partial windings ZI and ZII on secondary winding II are therefore represented by winding ΔZII of the transformer portion U2. The sense, or direction, of winding ΔZII is opposite to that of the secondary winding II, whereas the sense of winding ΔZI is the same as that of primary winding I; as a result, a current *iv* flowing through winding portions ΔZI and ΔZII induces a voltage in secondary winding II of transformer portion U2 which is of opposite phase to the voltage which it induces in primary winding I of the transformer portion U1. Thus, the voltages *u*I and *u*II respectively appearing across the two windings I and II, by reason of current flowing in the supplemental winding, are shown of opposite phase in FIG. 3*c*.

FIG. 3*a* discloses a circuit utilizing a transformer such as that previously discussed with reference to FIGS. 3*b* and 3*c*. The transformer UL of FIG. 3*a* is employed in a low pass filter circuit to provide a matching function; in addition, the transformer provides a series inductance in the filter circuit. The transformer includes primary and secondary windings I and II and supplemental windings ZI and ZII, in accordance with the description of FIGS. 3*b* and 3*c*. For the sake of simplification, it shall be assumed that the transformer UL of FIG. 3*a* has a transformation ratio of 1:1 i.e., that the primary and secondary windings have the same number of turns.

The circuit of FIG. 3*a* is developed in accordance with the discussion relating to FIG. 2*b*; i.e., capacitor C3 is connected in shunt across the primary winding I in place of a capacitor C1 (not shown), across the secondary winding II. However, no separate coil (such as coil L of FIG. 1) is included in the filter. The filter effect of the circuit of FIG. 3*a* is achieved by condenser C2, the two portions I*s* and II*s* of the leakage inductance of transformer UL, and the condenser C3. The characteristic losses of the primary and secondary windings I and II are represented by the resistances RI and RII, respectively. The amplifier V is identical to the amplifier V of FIG. 2*b*, and identical elements are indicated by identical notations. In accordance with the description of the transformer UL of FIGS. 3*b* and 3*c*, the supplemental winding connected in the collector circuit of the transistor T is in two portions, ZI and ZII, which are coupled to the windings I and II, respectively, and in opposite senses.

In accordance with the invention, the transformer UL is connected with the amplifier V which provides for establishing current flow in the supplemental windings ZI and ZII which compensate for characteristic losses in the inductances of the circuit. The amplifier V, as mentioned above in connection with FIG. 2*b*, produces a current *iv* which is conducted through the two series-connected winding portions ZI and ZII of the supplemental winding of transformer UL; as explained with reference to FIG. 3*b*, opposite polarity voltages *u*I and *u*II thereby are induced in the primary and secondary windings I and II, respectively. The two voltages *u*I and *u*II thereby are induced in the primary and secondary ing from the flow of current through the resistors RI and RII respectively, of transformer UL and effectively cancel their loss effect from the circuit.

The amplifier V is connected at its input across the capacitor X which is in series with the secondary winding II of transformer UL. When the current flow through the low pass filter changes to the opposite direction from that indicated (by the arrow adjacent to the letter *i*), the current flow through reactance X also reverses direction. As a result, the rate of change of current *iv* through transistor T reverses, reversing the polarity of the voltages *u*I and *u*II, which thereby again oppose the voltage drops due to the resistance losses of the windings I and II. Thus, the circuit arrangement can also be inserted in a bidirectional filter.

The operation of the circuit of FIG. 3*a* is more completely described as follows. When an alternating signal is applied to the low pass filter, a current *i* is established in the primary winding I, in the direction indicated by the arrow for a positive polarity at the upper input terminal, resulting in a voltage being induced in the secondary winding II. Voltage drops are experienced in both the primary, or input, and secondary, or output, sides of the transformer UL, due to the loss resistors RI and RII thereof. These voltage drops are in phase with the current *i*; since the transformer UL has a 1:1 transformation ratio, the voltage drops of the resistance losses tend to make the output voltage smaller than the input voltage. The output voltage across secondary winding II produces a current which flows through and produces a voltage drop across the reactance X. Since the reactance X is a capacitor, the voltage drop across it lags the current *i* by 90 degrees. Amplifier V produces a current *iv* which changes in magnitude in proportion to, and in phase with, the voltage drop across the reactance X. The current *iv* is conducted through the two winding portions ZI and ZII of the supplemental windings, which, in turn, induce voltages *u*I and *u*II which lag the current *iv* by 90 degrees, in the windings I and II, respectively. Due to the opposite sense of the winding portions ZI and ZII relatively to their respectively associated windings I and II, the voltage induced in winding I is at opposite phase to the input voltage, whereas the voltage induced in the winding II is in phase with the output voltage. If the input and output are reversed—i.e., winding II is the input and winding I the output, the phase relationship of the voltage from the supplemental winding portions ZI and ZII are also reversed. As a result, the current *iv* at all times serves to induce voltages in the supplemental winding portions which oppose the voltage drops due to characteristic losses in the circuit, and the output of the circuit thereby always appears to be very low in loss.

The leakage inductances I*s* and II*s* of transformer UL must be small as compared to the inductances of the windings I and II of transformer UL, in order to avoid the circuit appearing as a low impedance shunt to low frequency signals. As a result, the leakage flux of transformer UL must flow through a material of less permeability, for example, in air, even though the primary flux of transformer UL flows mainly in a highly permeable ferro-magnetic material. As a consequence, the leakage inductances of transformer UL have the characteristics essentially of a coil having an air core.

As is well known, the quality factor, of Q (i.e. the ratio of inductance to resistance) in the case of an air core inductor coil at low frequencies is very low as compared to an inductor with ferro-magnetic core material. In addition, as noted earlier, when inductors of low Q are used in filters, the properties of the filters, such as damping or attenuation in the band pass and the attenuation curve in the cut-off range, also deteriorate. Therefore the utilization of the leakage inductance of a transformer as an inductance in a filter is only possible when at the same time the losses of the transformer are reduced. This result is achieved in accordance with the invention in the circuit of FIG. 3*a*; the circuit of the invention therefore is of great utility.

The transformer utilized in the circuit of FIG. 3*a* is constructed such that a voltage, reducing the characteristic losses, is induced in each of its main windings. It will readily be appreciated by those skilled in the art, however, that the voltages for reducing the losses can be induced in the windings when the latter are in a circuit configuration different from that shown. For example, if the windings are arranged in such a way that there is induced a voltage for decreasing the losses, only in one of the primary and secondary windings an improvement in operating properties may still be obtained. As mentioned above, in accordance with the teachings of the invention, not only the operating properties of a transformer can be improved, but also the losses of impedances connected at the input and output of the transformer can be reduced. This result is attained, for example, with reference to the circuit of FIG. 3*a* when at least one of the shunt capacitors of the low pass filter is connected in such a way that at least part of the transmission line into which the low pass filter is inserted is located between the shunt capacitor in question and the remaining part of the low pass filter. Then a decrease of the losses pertaining to this part of the transmission line also is achieved. For example, in the circuit of FIG. 3*a*, the resistors RI and RII then would represent the resistance loss of the portions of the transmission line between the shunt capacitor C3 and the transformer UL. in addition to the resistance losses of the windings of the transformer.

It will be evident that many changes could be made in the circuits and the transformer construction of the invention without departure from the scope thereof. Accordingly, the invention is not to be considered limited to the particular embodiments disclosed herein, but rather only by the scope of the appended claims.

It is therefore intended by the appended claims to cover all such modifications and adaptations as fall within the true spirit and scope of the invention.

What is claimed is:

1. A circuit providing compensation for the characteristic losses of an inductance comprising:
- an inductance including a winding (H or I or II) having a characteristic loss (*i·Rh* or *i·RI* or *i·RII*),
- a supplemental winding (Z or ZI, ZII) inductively coupled to said winding (H or I or II),
- an amplifier (V) having input terminals and output terminals,
- response means (X) for applying an input signal to the input terminals of said amplifier (V) in proportional response to current flow in said inductance, consisting of a capacitor connected in series with said winding (H, II) of said inductance (L, UL) and in parallel to the input terminals of said amplifier (V), and
- said amplifier (V) being operable to provide a current (*iv*) through said supplemental winding (Z or ZI, ZII) to induce a voltage (*ut* or *u*I or UII) in said winding (H or I or II) to compensate for the voltage drop of said characteristic loss (*i·Rh* or *i·RI* or *i·RII*).

2. A circuit providing compensation for the characteristic losses of an inductance comprising:
- an inductance including a winding (H or I or II) having a characteristic loss (*i·Rh* or *i·RI* or *i·RII*),
- a supplemental winding (Z or ZI, ZII) inductively coupled to said winding (H or I or II),
- an amplifier (V) having input terminals and output terminals,
- response means (X) for applying an input signal to the input terminals of said amplifier (V) in proportional response to current flow in said inductance,
- a transformer (UL) including two magnetically coupled main windings (I, II) having characteristic losses (*i·RI, i·RII*) respectively associated therewith and including a predetermined value of leakage flux,
- said response means (X) being connected in series with one of said main windings (II) of said transformer (UL),
- said supplemental winding (ZI and ZII) comprising a first winding portion (ZI) primarily inductively coupled with a first one of said main windings (I) and a second winding portion (ZII) primarily inductively coupled with a second one of said main windings (II),
- said first and second winding portions (ZI, ZII) being wound in opposite senses,
- said amplifier (V) being operable to provide a current (*iv*) through said supplemental winding portions (ZI, ZII) to induce voltages (*u*I, *u*II) of opposite phase in said main windings (I, II) to compensate for the characteristic losses (*i·RI, i·RII*) of said transformer (UL),
- first and second capacitors (C3, C2),
- said first capacitor (C3) being connected in shunt to one of said main windings (I),
- said second capacitor (C2) being connected in shunt to the series connection of the other of said main windings (II) and said response means (X), and
- said inductance comprising said leakage flux of said transformer (*ul*) providing an effective series inductance between said first and second capacitors.

3. A circuit providing compensation for the characteristic losses of an inductance comprising:
- an inductance including a winding (H or I or II) having a characteristic loss (*i·Rh* or *i·RI* or *i·RII*),
- a supplemental winding (Z or ZI, ZII) inductively coupled to said winding (H or I or II),
- an amplifier (V) having input terminals and output terminals,
- response means (X) for applying an input signal to the input terminals of said amplifier (V) in proportional response to current flow in said inductance,
- a transformer (UL) including two magnetically coupled main windings (I, II) having characteristic losses (*i·RI, i·RII*) respectively associated therewith and including a predetermined value of leakage flux,
- said response means (X) being connected in series with one of said main windings (II) of said transformer (UL),
- said supplemental winding (ZI and ZII) comprising a first winding portion (ZI) primarily inductively coupled with a first one of said main windings (I) and a second winding portion (ZII) primarily inductively coupled with a second one of said main windings (II),
- said first and second winding portions (ZI, ZII) being wound in opposite senses,
- first and second pairs of terminals,
- first and second capacitors (C3, C2) connected to shunt to said first and second pairs of terminals, respectively,
- first means connecting one of said main windings (I) across said first capacitor (C3),
- second means connecting said response means (X) in series with the other of said main windings (II) across said second capacitor (CZ),
- said inductance comprising said leakage flux of said transformer (UL) providing a series inductance between corresponding ones of said first and second pairs of filter terminals, and
- said amplifier (V) being operable to provide a current (*iv* ) to said supplemental winding poritions (ZI, ZII) to induct voltages (*u*I, *u*II) of opposite phase in said main windings (I, II) to compensate for the characteristic losses ($i \cdot RI$, $i \cdot RII$) of said transformer (UL) and of at least one of said first and second connecting means.

4. A circuit providing compensation for the characteristic losses of an inductance comprising:

an inductance including a winding (H or I or II) having a characteristic loss ($i \cdot Rh$ or $i \cdot RI$ or $i \cdot RII$), a supplemental winding (Z or ZI, ZII) inductively coupled to said winding (H or I or II), an amplifier (V) having input terminals and output terminals, response means (X) for applying an input signal to the input terminals of said amplifier (V) in proportional response to current flow in said inductance, a transformer (UL) including two magnetically coupled main windings (I, II) having characteristic losses ($i \cdot RI$, $i \cdot RII$) respectively associated therewith and including a predetermined value of leakage flux.

said response means (X) being connected in series with one of said main windings (II) of said transformer (UL), said supplemental winding (ZI and ZII) comprising a first winding portion (ZI) primarily inductively coupled with a first one of said main windings (I) and a second winding portion (ZII) primarily inductively coupled with a second one of said main windings (II), said first and second winding portions (ZI, ZII) being wound in opposite senses, said amplifier (V) being operable to provide a current ($iv$) through said supplemental winding portions (ZI, ZII) to induce voltages ($u$I, $u$II) of opposite phase in said main windings (I, II) to compensate for the characteristic losses ($i \cdot RI$, $i \cdot RII$) of said transformer (UL), said transformer comprising a core structure symmetrical about at least one plane through the axis thereof and including a central portion extending along said axis from each end of said structure and defining an air gap (S) at the center thereof, a wall (W) extending transversely to said axis and spaced from said central portion adjacent said air gap (S), said supplemental winding portions (ZI, ZII) being axially displaced on opposite sides of said wall, and wound in opposite senses relatively to each other about said central core portion, and said windings (I, II) being axially displaced on opposite sides of said wall and wound in the same sense relatively to each other about their respectively associated supplemental winding portions (ZI, ZII).

5. A circuit as recited in claim 1 wherein:

said amplifier (V) includes a transistor (T) having emitter, base, and collector terminals, said response means (X) being connected to the base of said transistor (T), and, said supplemental winding (Z or ZI, ZII) being connected to the collector of said transistor (T).

6. A circuit as recited in claim 5 wherein said transistor (T) includes a resistor (R$e$) connected to the emitter thereof and which is adjustable to control the level of conduction of said transistor (T) to establish a current flow ($iv$) through said supplemental winding (Z, or ZI, ZII) for inducing a voltage in said winding (H or I or II) of a magnitude to compensate for said characteristic losses ($i \cdot Rh$ or $i \cdot RI$ or or $i \cdot RII$) thereof.

7. A circuit as recited in claim 6 wherein:

said characteristic losses of said inductance (L or UL) are temperature dependent, and said resistor (R$e$) is a temperature dependent resistor and has a temperature coefficient providing automatic adjustment of the operation of said transistor (T) of said amplifier (V) to adjust the value of the current ($iv$) in response to temperature changes to provide compensation for said characteristic losses ($i \cdot Rh$ or $i \cdot RI$ or $i \cdot RII$) over a wide temperature range.

8. A circuit as recited in claim 1 for use in a filter wherein there are further provided:

first and second pairs of terminals for said filter, means connecting said inductance (L or UL) as a series inductance between related ones of said first and second pairs of filter terminals, first and second capacitors (C3, C2), and, means connecting said first and second capacitors (C3, C2) in shunt between said first and second pairs of filter terminals, respectively.

9. A circuit as recited in claim 1 wherein there is further provided:

a transformer (U) including a pair of main windings (W1, W2) having respectively associated therewith characteristic losses (R1, R2), said inductance (L) being connected in series with one of said main windings (W2), and, said amplifier (V) being operable to provide a current ($iv$) to said supplemental winding (Z) to induce a voltage ($ut$) in said winding (H) of said inductance (L) to compensate for the characteristic losses ($i$.R) of said transformer (U) and of said inductance (L).

10. A circuit as recited in claim 9 for use in a filter wherein there is further provided:

first and second pairs of terminals for said filter, first and second capacitors (C3, C2) connected in shunt to said first and second pairs of filter terminals, respectively, first means connecting one of said main windings (W1) across said first capacitor (C3), second means connecting said response means (X), the other of said main windings (W2) and said inductance (L) in series across said second capacitor (C2), and said amplifier (V) being operable to provide a current ($iv$) to said supplemental winding (Z) to induce a voltage ($ut$) in said winding (H) of said inductance (L) to compensate for the characteristic losses ($i$.R) of said transformer (U), said inductance (L) and at least one of said first and second connecting means.

11. A circuit as recited in claim 1 wherein there is further provided:

a transformer (UL) including two magnetically coupled main windings (I, II) having characteristic losses ($i \cdot RI$, $i \cdot RII$) respectively associated therewith and including a predetermined value of leakage flux, said inductance comprising said leakage flux of said transformer (UL), said response means (X) being connected in series with one of said main windings (II) of said transformer (UL), and said amplifier (V) being operable to provide a current to said supplemental winding (ZI and ZII) to induce a voltage ($uii$) in one of said main windings (II) to compensate for the characteristic losses ($i \cdot RII$) to said transformer (UL).

12. A circuit as recited in claim 11 wherein:

said supplemental winding (ZI and ZII) comprises a first winding portion (ZI) primarily inductively coupled with a first one of said main windings (I) and a second winding portion (ZII) primarily inductively coupled with a second one of said main windings (II), said first and second winding portions (ZI, ZII) being wound in opposite senses, and said amplifier (V) being operable to provide a current ($iv$) through said supplemental winding portions (ZI, ZII) to induce voltages ($u$I, $u$II) of opposite phase in said main windings (I, II) to compensate for the characteristic losses ($i \cdot RI$, $i \cdot RII$) of said transformer (UL).

13. A circuit as recited in claim 12 wherein there is further provided:

first and second capacitors (C3, C2), said first capacitor (C3) being connected in shunt to one of said main windings (I), said second capacitor (C2) being connected in shunt to the series connection of the other of said main windings (II) and said response means (X), and said inductance comprising said leakage flux of said transformer (UL) providing an effective series inductance between said first and second capacitors.

14. A circuit as recited in claim 12 for use in a filter wherein there is further provided:

first and second pairs of terminals for said filter, first and second capacitors (C3, C2) connected in shunt to said first and second pairs of terminals, respectively, first means connecting one of said main windings (I) across said first capacitor (C3), second means connecting said response means (X) in series with the other of said main windings (II) across said second capacitor (CZ), said inductance comprising said leakage flux of said transformer (UL) providing a series inductance between corresponding ones of said first and second pairs of filter terminals, and said amplifier (V) being operable to provide a current (*iv*) to said supplemental winding portions (ZI, ZII) to induce voltages( *u*I, *u*II) of opposite phase in said main windings (I, II) to compensate for the characteristic losses ($i \cdot RI$, $i \cdot RII$) of said transformer (UL) and of at least one of said first and second connecting means.

15. A circuit as recited in claim 12 wherein said transformer (UL) comprises:

a core structure symmetrical about at least one plane through the axis thereof and including a central portion extending along said axis from each end of said structure and defining an air gap (S) at the center thereof, a wall (W) extending transversely to said axis and spaced from said central portion adjacent said air gap (S), said supplemental winding portions (ZI, ZII) being axially displaced on opposite sides of said wall, and wound in opposite senses relatively to each other about said central core portion, and said windings (I, II) being axially displaced on opposite sides of said wall and wound in the same sense relatively to each other about their respectively associated supplemental winding portions (ZI, ZII).

16. A circuit as recited in claim 4 wherein:

said supplemental winding portions (ZI, ZII) comprise cylindrical windings, and said main windings (I, II) comprise disc windings.

17. A circuit as recited in claim 4 wherein.

said air gap (S) is adjusted in size to establish substantially air core characteristics of the coils comprising the supplemental winding portions (ZI, ZII), and said core structure provides substantially ferro-magnetic core characteristics of said windings (I, II) of said transformer (UL).

References Cited

UNITED STATES PATENTS

| | | | |
|---|---|---|---|
| 3,039,067 | 6/1962 | Brauner | 331—117 |
| 3,152,309 | 6/1964 | Bogusz et al. | 333—80 |
| 3,178,650 | 4/1965 | Hamasaki | 330—61 |
| 2,823,357 | 2/1958 | Hall. | |
| 2,870,421 | 1/1959 | Goodrich. | |
| 2,930,996 | 3/1960 | Chow. | |

H. K. SAALBACH, Primary Examiner

C. BARAFF, Assistant Examiner

U.S. Cl. X.R.

330—26; 331—115